(12) United States Patent
Leu

(10) Patent No.: US 6,338,178 B1
(45) Date of Patent: Jan. 15, 2002

(54) WINDSHIELD WIPER ASSEMBLY WITH A SPOILER

(75) Inventor: Robert Leu, Taipei (TW)

(73) Assignee: Leadership Automotive Parts Co., Ltd., Taipei (TW)

( * ) Notice: Subject to any disclaimer, the term of this patent is extended or adjusted under 35 U.S.C. 154(b) by 0 days.

(21) Appl. No.: 09/668,481

(22) Filed: Sep. 25, 2000

(51) Int. Cl.$^7$ .................................................. B60S 1/38
(52) U.S. Cl. .............................. 15/250.201; 15/250.44
(58) Field of Search ..................... 15/250.201, 250.44, 15/250.361, 250.43, 250.48, 250.351

(56) References Cited

FOREIGN PATENT DOCUMENTS

| EP | 287464 | * | 10/1988 | ............ | 15/250.201 |
|---|---|---|---|---|---|
| EP | 499829 | * | 8/1992 | ............ | 15/250.201 |

* cited by examiner

*Primary Examiner*—Gary K. Graham
(74) *Attorney, Agent, or Firm*—A & J

(57) ABSTRACT

A windshield wiper assembly includes a yoke having two arms each formed with two elongated openings between which there is a recess, wherein a spoiler extends from one side of the yoke and has a convex upper side and a concave lower side, a plurality of grooves are formed between the spoiler and the yoke in which the grooves increase in size from two ends thereof such that the groove at an intermediate portion is the largest and the groove at the end is the smallest, and the yoke is formed with a plurality of lugs each extending downwardly through a corresponding one of the grooves, whereby the windshield wiper assembly will give multiple deflecting effects to the wind thus enabling the windshield wiper assembly to move smoothly and steadily on the windshield.

1 Claim, 4 Drawing Sheets

WINDSHIELD WIPER ASSEMBLY WITH A SPOILER

BACKGROUND OF THE INVENTION

1. Field of the Invention

This invention is related to a windshield wiper assembly and in particular to one which can provide multiple deflecting effects to wind.

2. Description of the Prior Art

It has been found that the conventional windshield wiper blade has a tendency to lift from the windshield when the driving speed is high Hence, it has been proposed to mount a spoiler on the wiper or on the windscreen wiper arms in such a way to create an aerodynamic effect which acts to apply the wiper against the glass surface to be wiped. FIGS. 1, 2A and 2B illustrate a prior art windshield wiper assembly 1 with a spoiler, which includes a main yoke 11 having a spoiler 12 extending from the rim of one of the side walls of the main yoke adjacent to the wiper element However, in case of high driving speed, the wind rebound from the windshield will cause the blade 5 to have a tendency to lift from the windshield 6 (see FIGS. 2A and 2B) thereby making the spoiler 12 unable to solve the problem satisfactorily.

Therefore, it is an object of the present invention to provide an improved windshield wiper assembly with a spoiler which can obviate and mitigate the above-mentioned drawbacks.

SUMMARY OF THE INVENTION

This invention is related to an improvement in the structure of a windshield wiper assembly.

It is the primary object of the present invention to provide a windshield wiper assembly which includes a yoke having two arms each formed with two elongated openings between which there is a recess, wherein a spoiler extends from one side of the yoke and has a convex upper side and a concave lower side, a plurality of grooves which are formed between the spoiler and the yoke in which the grooves increase in size from two ends thereof such that the groove at an intermediate portion is the largest and the groove at the end is the smallest, and the yoke which is formed with a plurality of lugs each extending downwardly through a corresponding one of the grooves.

It is another object of the present invention to provide a windshield wiper assembly which can move smoothly and steadily on the windshield even when the driving speed is very fast.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
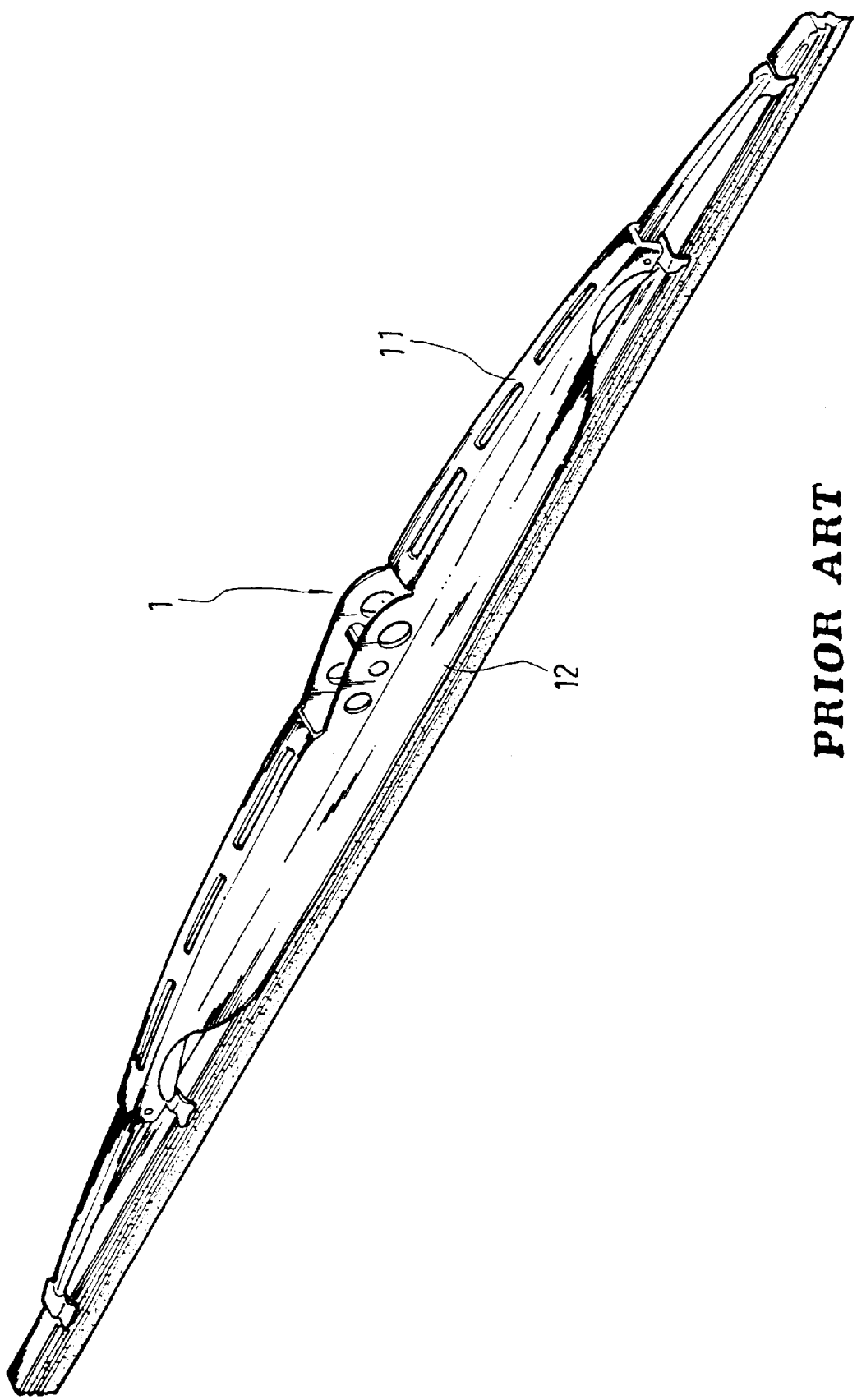
FIG. 1 is a perspective view of a prior art windshield wiper assembly.
Figure 2A:
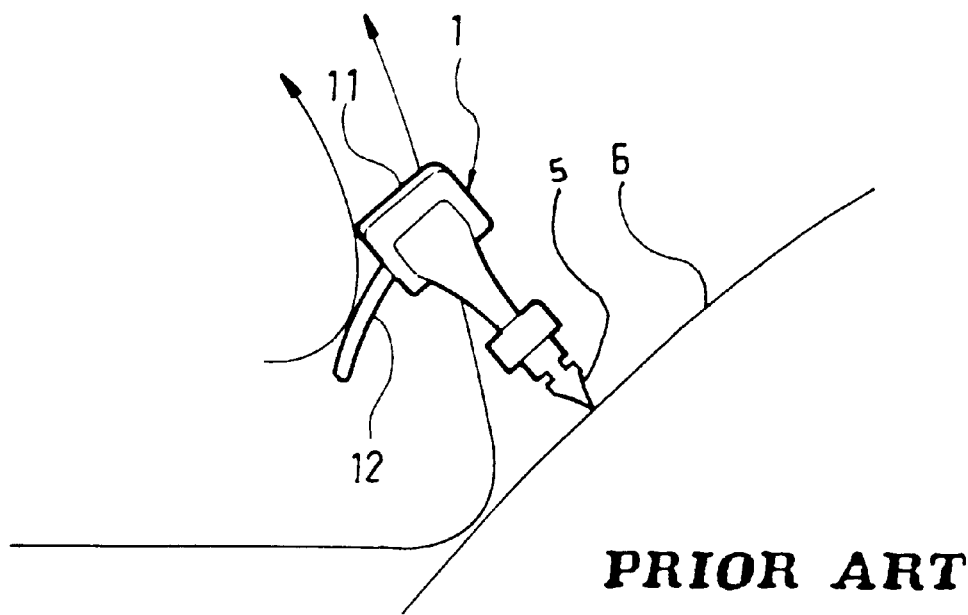
FIGS. 2A and 2B illustrate how the prior art windshield wiper assembly is affected by the wind rebound from the windshield.
Figure 2B:
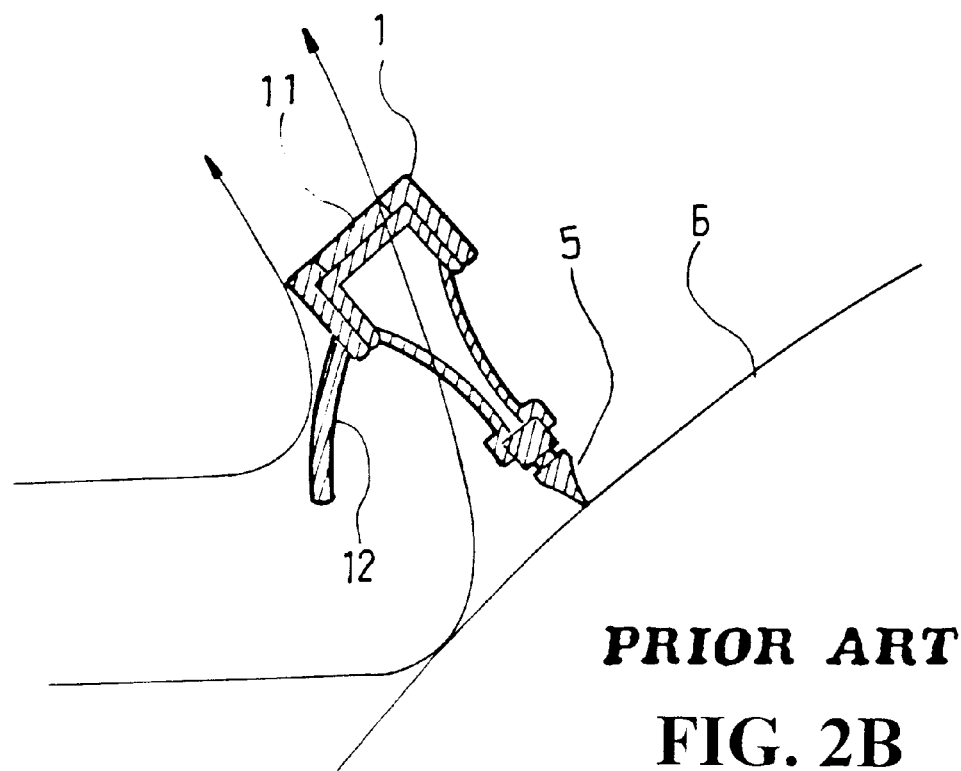

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 3:
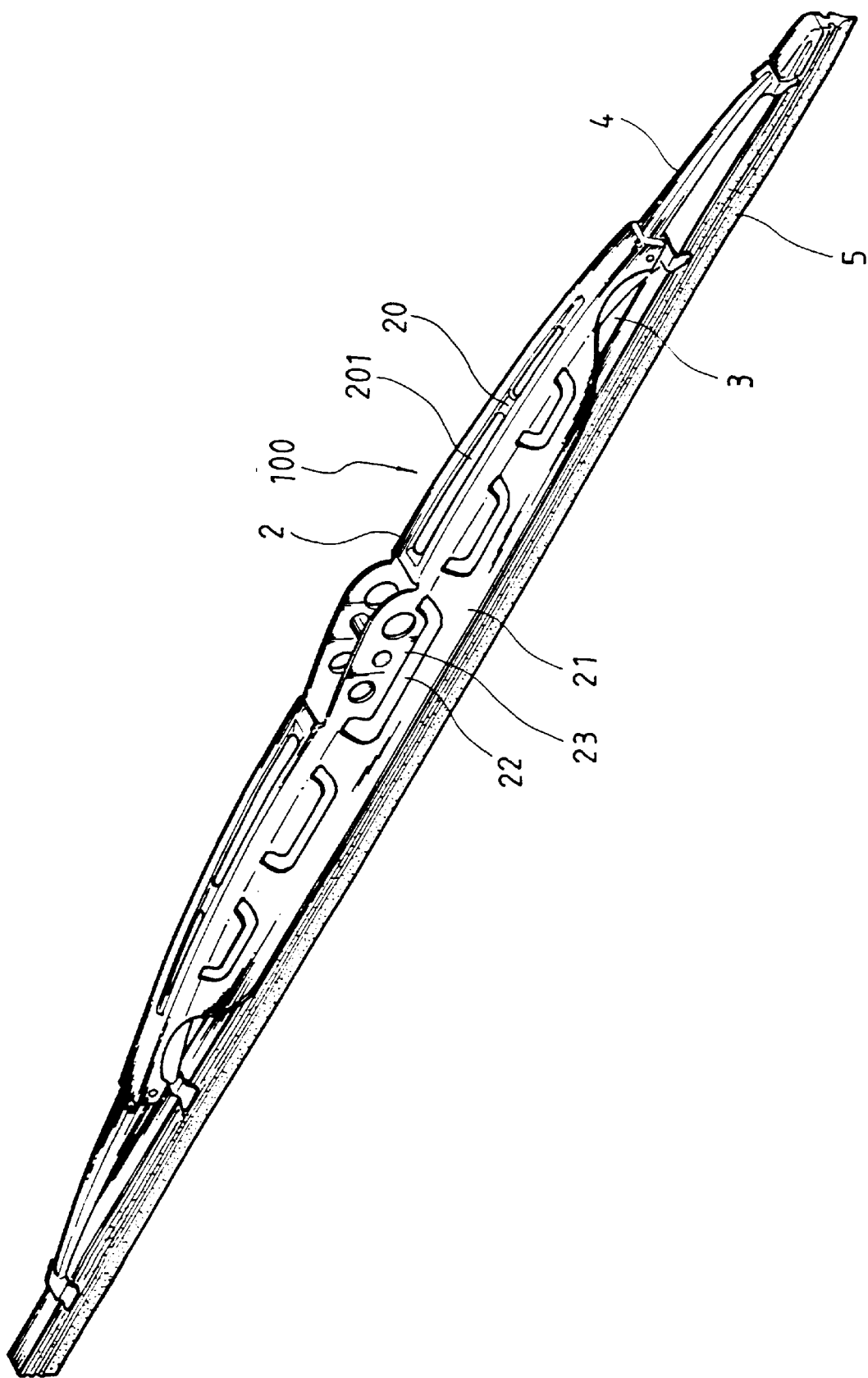
FIG. 3 is a perspective view of a windshield wiper assembly with a spoiler according to the present invention.
Figure 4:
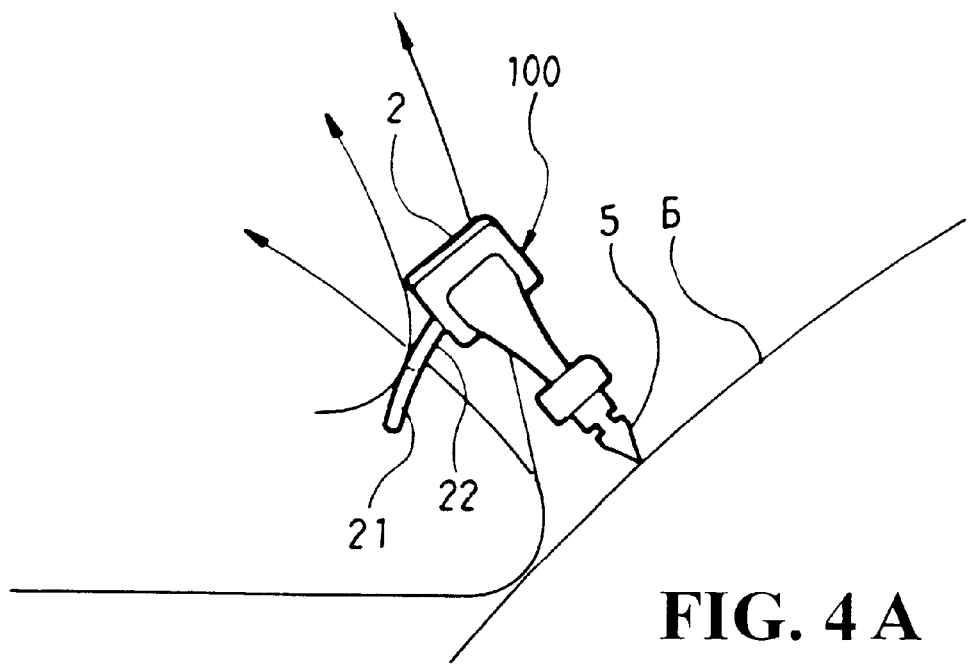
FIGS. 4A and 4B illustrate the working principle of the present invention.
Figure 4:
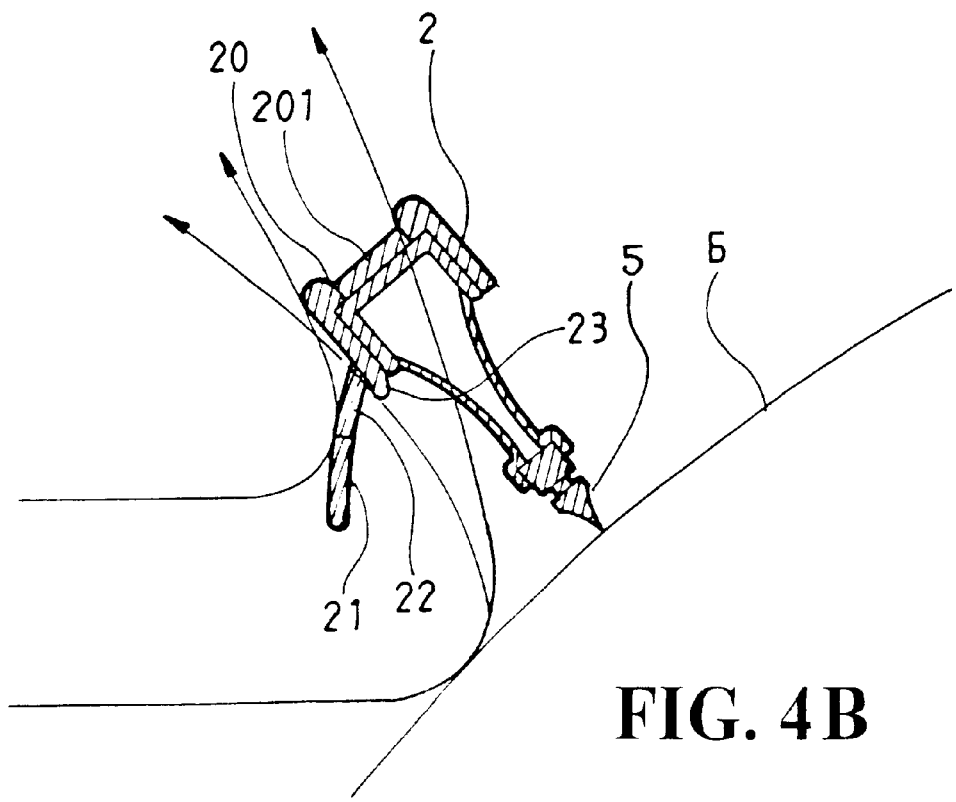

With reference to the drawings and in particular to FIGS. 3, 4A and 4B thereof, the windshield wiper assembly 100 with a spoiler according to the present invention generally comprises a yoke 2, a pair of master blade holders 4, a pair of assistant blade holders 3, a rubber blade 5 and a spoiler 21. The yoke 2 has two arms each formed with two elongated openings 201 between which there is a recess 20. The spoiler 21 extends from one side of the yoke 2 and has a convex upper side and a concave lower side. There are five grooves 22 between the spoiler 21 and the yoke 2. The yoke 2 is formed with five lugs 23 each extending downwardly through a corresponding one of the grooves 22. The grooves 22 increase in size from two ends of the yoke such that the groove 22 at the intermediate portion is the biggest and the groove 22 at the end is the smallest. Hence, when the windshield wiper moves on the windshield, the wind will be deflected by the spoiler 21 and further deflected by the lugs 23 when passing through the grooves 22 thereby increasing the deflecting effect and causing the windshield wiper to move smoothly.

Referring to FIGS. 4A and 4B, when a car travels at a high speed, the wind will flow along the upper side of the spoiler 21, while the wind rebounded from the windshield 6 will flow through lugs 23 via the grooves 22 and the elongated slots 201 thus providing several steps for deflecting the wind.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A windshield wiper assembly comprising a yoke having two arms each formed with two elongated openings between which there is a recess, wherein a spoiler extends from one side of said yoke and has a convex upper side and a concave lower side, a plurality of grooves are formed between said spoiler and said yoke wherein said grooves increase in size from two ends thereof such that one of said grooves at an intermediate portion is the largest and the grooves at the ends are the smallest, and said yoke is formed with a plurality of lugs each extending downwardly through a corresponding one of said grooves.

* * * * *